(12) United States Patent
Holl

(10) Patent No.: US 7,534,404 B2
(45) Date of Patent: May 19, 2009

(54) METHODS OF OPERATING SURFACE REACTORS AND REACTORS EMPLOYING SUCH METHODS

(75) Inventor: Richard A. Holl, Camarillo, CA (US)

(73) Assignee: Holl Partners LLC, Camarillo, CA (US)

( * ) Notice: Subject to any disclaimer, the term of this patent is extended or adjusted under 35 U.S.C. 154(b) by 501 days.

(21) Appl. No.: 10/570,180

(22) PCT Filed: Sep. 4, 2004

(86) PCT No.: PCT/US2004/028745

§ 371 (c)(1),
(2), (4) Date: Feb. 28, 2006

(87) PCT Pub. No.: WO2005/025732

PCT Pub. Date: Mar. 24, 2005

(65) Prior Publication Data

US 2006/0286015 A1    Dec. 21, 2006

(51) Int. Cl.
*B01J 8/08* (2006.01)
*B01D 47/16* (2006.01)
*B01F 3/04* (2006.01)

(52) U.S. Cl. .................. 422/209; 422/224; 422/86; 422/89; 422/135; 422/138; 422/186; 422/186.3; 422/129; 422/100; 261/86; 261/89

(58) Field of Classification Search .................. 422/135, 422/138, 186, 186.3, 224, 129, 209, 100; 261/89, 86
See application file for complete search history.

(56) References Cited

U.S. PATENT DOCUMENTS

| 7,041,751 | B2 * | 5/2006 | Jachuck et al. ................. 526/88 |
| 7,125,527 | B2 * | 10/2006 | Holl ........................... 422/209 |
| 2003/0161767 | A1 * | 8/2003 | Ramshaw et al. ...... 422/186.29 |

* cited by examiner

*Primary Examiner*—Walter D Griffin
*Assistant Examiner*—Huy-Tram Nguyen
(74) *Attorney, Agent, or Firm*—Koppel, Patrick, Heybl & Dawson; Michael J. Ram

(57) ABSTRACT

New methods of operating surface reactors, and such reactors, particularly spinning disk reactors, require that a first reactant is fed to a reactor surface (20) and forms a thin radially outward moving film (60) thereon in a reaction passage (42) formed between the reaction surface (20) and a parallel, closely spaced (less than 1 mm) retaining surface (40). The passage thickness is precisely controllable and the surfaces (20, 40) move relative to one another so that strong shear is applied to the material between them. A second reactant is fed to the surface (20) as a second thin film (65) that as it enters the first film (60), preferably perpendicularly, it is immediately merged therewith along a correspondingly very narrow interaction line (66) by the shear at a rate such as to break up molecular clusters in the films, so that their molecules can aggressively and completely interact by forced interdiffusion. In spinning disk (18) apparatus the first film (60) is fed along the spin axis (14), while subsequent films (65, etc.) are fed at respective distances from the axis (14) such that there is adequate shear for the molecular cluster disruption. Preferably each film (65, etc.) after the first (60) is fed into the reaction passage (42) through a respective thin annular nozzle producing a thin circular film (65) that simultaneously merges with the first film (60) along its entire length.

23 Claims, 4 Drawing Sheets

METHODS OF OPERATING SURFACE REACTORS AND REACTORS EMPLOYING SUCH METHODS

FIELD OF THE INVENTION

The invention is concerned with new methods of operating surface reactors, and with new reactors employing such methods, and especially but not exclusively to methods and reactors employing the so-called spinning disk technology.

BACKGROUND OF THE INVENTION

Chemical reactions cannot occur until individual molecules of the reagents are brought together, and physical interactions between components are greatly facilitated as the components are more and more intimately mixed together. Bulk stirring is only able to present the opportunity for reagent molecules to contact one another after sufficient time has elapsed to provide the necessary uniformity of interdispersion of the reagents' molecules for achieving the desired one on one contact which finally makes a reaction possible, and only molecular diffusion can accomplish the required one on one contact, which is a very slow process. These encounters can be helped to occur by establishing small scale fluid structures or eddies within which molecular diffusion becomes significant. The role of the reactor, and the mixing and mass transfer equipment associated with it, is to create these small scale fluid structures In order to generate and improve mixing, mass transfer and molecular inter-diffusion. The reactor equipment must therefore direct energy into the fluid system in the correct way. In a stirred tank reactor (STR) the energy input clearly comes from the impeller, but this arrangement suffers from high energy losses through friction, macro-agitation, mere recirculation of the fluid, and other factors. The energy which is usefully employed is focused mainly upon the fluid in contact with the impeller, particularly with its leading edges, along which occurs the only action which can be called forced, molecular inter-diffusion. This means that while the power input at the impellor tip may be very high (e.g. 1000 W/kg) the majority of the fluid is not undergoing forced molecular inter-diffusion, and the average power input across the whole tank producing conversion is low (e.g. 0.1-1 W/kg).

A further important disadvantage of bulk agitated chemical reaction systems is the fact that dimensional scaling up or down also changes the kind and quality of the resultant product. Very often, time consuming trial and error experimentation is required after a change in vessel dimensions. It may take as many as 5 years for some reactions to be scaled up from test tube to a fully undustrial sized apparatus. This handicap is a consequence of the changing ratio of wet volume to wetted surface areas when dimensional changes of the apparatus are made which will change the corresponding hydraulic radius and in turn the resulting Reynolds number of the agitated fluid. The larger the ratio of wet volume to wetted surface becomes the more difficult is the scaling up. For this reason, chemical engineers have been trying to move in the other direction, namely by raising the wetted surface to wet volume ratio and compensating for the lost economy of large scale by improving the intensity of the bulk agitation and consequent mass transfer.

The advances that have been obtained in improved mass transfer are, for example, by use of what is known as high-power, rotor-stator mixers, where the proportion of the fluid volume in contact with the rotor surface is much lower, and by use of static mixers and ejectors where the large amount of energy which can be supplied by pumps goes into the whole of the fluid hold-up volume through intensified supra-Kolmogoroff agitation. In this way higher power inputs (e.g. 100 W/kg) can be created, followed by improved mass transfer. However, such apparatus suffer from the inability to effect continuous, high-speed, uniform and forced inter-diffusion of reactant molecules on a sub-micron and nanometer scale, in addition to the inadequate thermal control available, for example, with highly exothermic, fast reactions. Another type of apparatus that has been employed comprises static micromixers, which can produce mixtures of liquids and gases, as well as generate multiphase dispersions. Such devices, which can be manufactured using methods borrowed from the electronics industry consist, for example, of a series of very small channels engraved or etched, for example, into a silicon wafer surface, through which the reaction components are passed together in laminar flow mode; the channels can for example be as small as 10 micrometers in diameter. The mixing mechanism is based on flow multilamination with subsequent interdiffusion of molecules between the overlapping fluid lamellae. When used as a reactor the reduction of the diffusional path length results in accelerated mass and heat transfer. Despite the improved mass transfer obtainable with the above mentioned equipment, many reactions are very slow because they are still diffusion controlled and therefore their rate depends on slow, natural, unforced, molecular inter-diffusion.

There is therefore increasing interest in what has been referred to as process intensification technology, fueled primarily by the need to provide industrial processes that are more efficient and economical than those employed to date. Such technology is applied to any physical and/or chemical process involving heat and/or mass transfer and/or physical and/or chemical reaction, the latter term including both chemical composition and decomposition, and it generally involves producing on, and/or introducing to, a moving surface a thin film or its equivalent (see explanation below) of each of the process components, so that interaction between them is greatly facilitated. It is also found that such interactions are possible under conditions of temperature and/or pressure that can be relatively closely controlled. When a process component has the form of a gas, or a vapor, or a plasma, it may be introduced to the surface in a form which is equivalent to a thin film, for example by bathing the surface in the component, or as a flow of the required thin dimension.

One way in which process intensification technology has been implemented is known as Spinning Disk technology, in which a body providing a disk-like surface, which may be flat or conical, is rotated about a spin axis to create centrifugal force across the surface. The process components are introduced on to the disk surface at or adjacent to the spin axis, whereby under the centrifugal force the component(s) flow radially outward in the form of thin films. Such apparatus was proposed initially for typical heat and mass transfer operations, and subsequently has been adapted for use as a reacting surface. The employment of the process component(s) in the form of very thin films also facilitates the application to the material(s) of different types of energy that will assist in promoting the process intensification, such as electromagnetic radiation or longitudinal pressure oscillations. Examples of such spinning disk apparatus, and their methods of operation, are described in U.S. Pat. No. 4,549,998 and PCT applications Nos. PCT/GB00/00519; PCT/GB00/00521; PCT/GB00/00523 and PCT/GB01/00634, all in the names of Colin RAMSHAW et al.

Professor Colin RAMSHAW and others of the Process Intensification and Innovation Centre (PIIC) at Newcastle University, England have developed processes and apparatus for continuous production of nano particles from various reactions using thin, highly sheared films on the top surface of a single rotating disk, usually now referred to as a Spinning Disk Reactor (SDR). Unsteady film surface waves on the disk surface, coupled with the shearing action of the rotating surface, ensure that micro mixing is achieved. These films are less than 100 microns thick and so offer a short diffusion path length, resulting in excellent heat and mass transfer. Residence times on the SDR range from a few seconds down to fractions of a second, and it is therefore well suited to fast processes where the inherent reaction kinetics are of the same order or faster than the mixing kinetics.

An evaluation of spinning disk reactor technology for the manufacture of pharmaceuticals was published in Industrial & Engineering Chemistry Research 2000, Vol 39, Issue 7, pp 2175-2182 by Brechtelsbauer C.; Ricard F.; Lewis N.; Oxley P.; and Ramshaw C. A continuously operating SDR displayed distinct advantages over batch processing techniques when several processes for the manufacture of pharmaceuticals were investigated as test reactions. It proved to be a useful tool for revealing the reaction rates of intrinsically fast kinetics as well as for optimizing processes with such kinetics. Very encouraging results were achieved for a phase-transfer-catalyzed (ptc) Darzen's reaction to prepare a drug intermediate and the recrystallization of an active pharmaceutical ingredient (API). In comparison to presently used batch processes the ptc reaction with the SDR had a 99.9% reduced reaction time, 99% reduced inventory, and 93% reduced impurity level. The recrystallization yielded particles with a tight particle size distribution and a mean size of around 3 µm.

An evaluation of an SDR for continuous processing was published in Organic Process Research & Development 2001, Vol 5, Issue 1, pp 65-68, again by Brechtelsbauer C.; Ricard F.; Lewis N.; Oxley P.; and Ramshaw C. The results obtained for two organic reactions and one crystallization are diskussed. The SDR was found to be a useful tool for revealing intrinsically fast kinetics as well as for optimizing a process with such kinetics. Control of particle size distribution was demonstrated with the crystallization investigated.

An evaluation of the use of an SDR in the application of electromagnetic radiation to chemical processes was given in a paper entitled Photo-initiated Polymerization Using A Spinning Disk Reactor by Dalglish, R.; Jachuck, A and Ramshaw, C. of the Process Intensification & Innovation Centre (PIIC), Newcastle University, England, presented at a conference entitled Process Intensification in the Chemical Industry, Antwerp, Netherlands, 25th Oct., 1999. The results of photo initiated polymerization studies carried out at PIIC using a spinning disk reactor are diskussed. Initial results have been promising and suggest a novel route for fast, controlled and continuous polymerization of free radicals. The effect of UV intensity, film thickness of the monomer/polymer film, and the rotational speed in the rate of polymerization has been studied. It is hoped that this technique may be used to perform polymerization reactions in seconds rather than hours.

SUMMARY OF THE INVENTION

It is an object of this invention to provide new methods of operating rotating surface reactors and reactors employing such methods facilitating fast and high rate conversion chemical and/or physical reactions involving liquid-liquid, solute-liquid, liquid-solid, solute-solid, liquid-gas and solute-gas reactions.

It is another object to provide such methods and apparatus in which it becomes possible to maximize the number of simultaneous encounters of a maximum number of reactant/solute molecules for the purpose of creating products from combinations of the molecules.

It is a further object to provide such methods and apparatus in which it becomes possible to maximize the number of simultaneous encounters of reactant/solute molecules with one another while they have assumed mutual spatial positions in which reaction is facilitated.

It is a further object to provide such methods and apparatus with which it becomes possible to accelerate intrinsically slow reactions.

In accordance with the invention there are provided methods of operating surface reactors comprising in each method the steps of:

providing a reactor body having a reactor surface;
  feeding a first reactant to the reactor surface from a first entry location so that the reactant spreads out on the surface in the form of a first thin film;
  feeding a second reactant to the reactor surface from a second entry location so that the reactants can interact in a reaction zone on the reaction surface; and
  collecting the product of the interacting reactants at an outlet location.

Also in accordance with the invention there are provided surface reactors each comprising:

a reactor body having a reactor surface;
  means for feeding a first reactant to the reactor surface from a first entry location so that the reactant spreads out on the surface in the form of a first thin film;
  means for feeding a second reactant to the reactor surface from a second entry location so that the reactants can interact in a reaction zone on the reactor surface; and
  means for collecting the product of the interacting reactants at an outlet location;

The methods and surface reactors of the invention are characterized in that:

the reactor body provides a retaining surface closely spaced from the reactor surface so as to form between them a reaction passage providing a reaction zone between the second entry location and the outlet location and through which the reactant or reactants fed to the reactor surface will pass, the surfaces being movable relative to one another to apply shear between them to the reactant or combination of reactants passing in the reaction passage;
  each reagent after the first reagent is fed to the reactor surface in the form of a respective thin film that is fed into a respective preceding thin film or combination of thin films, each thin film at its entry to the reaction passage, together with the preceding thin film or combination of thin films, immediately being subjected to continuous and uniform shear therein, the shear rate being such as to disrupt molecular clusters in the thin films and thereby permit the molecules of the thin films to aggressively bond with one another to form the resultant product.

The thickness dimension of the reaction chamber can be varied and is less than 1.00 mm (0.04 in), and preferably is less than 0.1 mm (0.004 in), and preferably each film after the first film is fed into the preceding film or combination of films at 90° to the reactor surface.

The reactor surface when the reactor is of the spinning disk type is provided by a rotor mounted by a support body and spun about an axis, the retaining surface being stationary and also being mounted by the support body, whereby the rotation of the reactor surface about the axis produces the shear in the first thin film and the interacting combination of thin films between itself and the retaining surface;

the reactor surface extends radially from the rotation axis; and each thin film that is fed into a preceding thin film is fed into that thin film at an entry location spaced radially from the rotation axis at a distance such as to provide sufficient shear to maintain the disruption of molecular clusters in the interacting films.

Preferably the reactor surface and the retaining surfaces are polished to a mirror finish smoothness.

DESCRIPTION OF THE DRAWINGS

Methods and apparatus that are particular preferred embodiments of the invention will now be described, by way of example, with reference to the accompanying diagrammatic drawings, wherein:—

Figure 1:
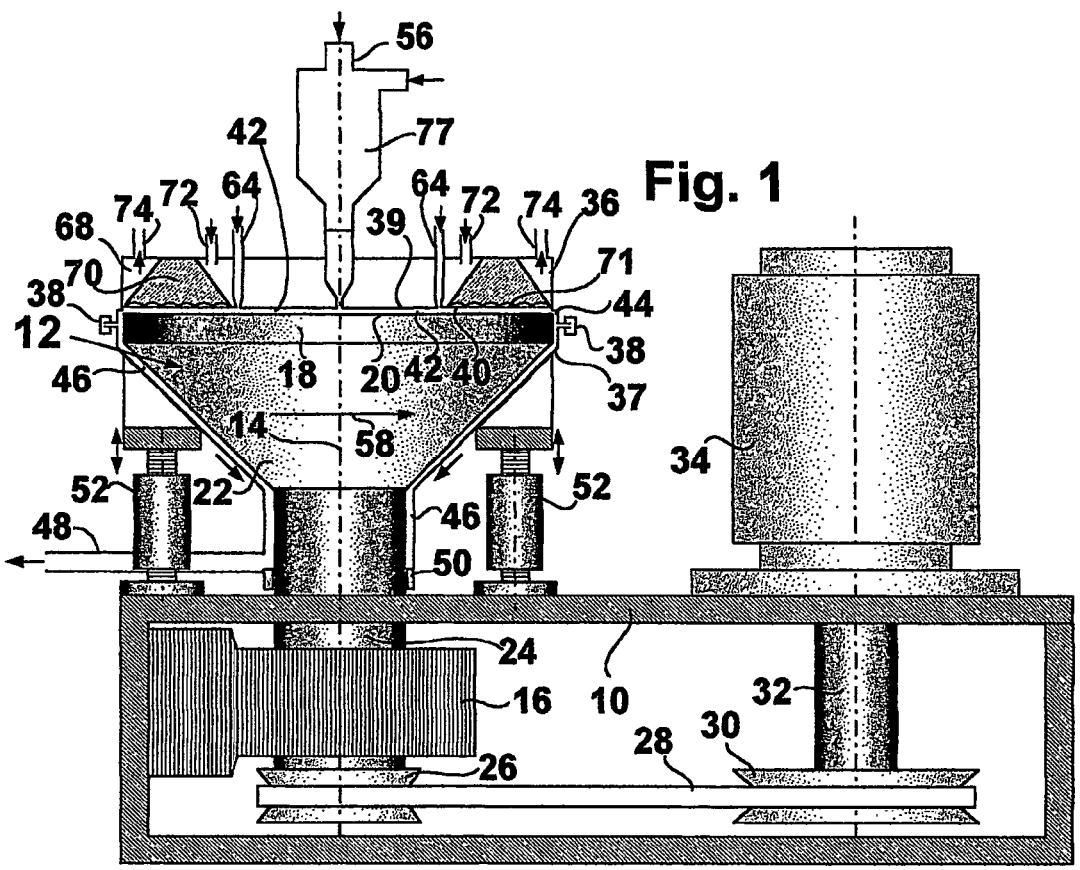
FIG. 1 is a part side elevation and part cross section through a vertical longitudinal axis of a first embodiment of apparatus of the invention, comprising a spinning disk reactor, in order to illustrate the principal construction features of one such apparatus.

Similar parts are given the same reference number in all of the figures, whenever that is possible. It will be understood by those skilled in the art that many of the spacing dimensions of closely spaced surfaces are far too small to be represented clearly in a drawing, and therefore are exaggerated for clarity.

DESCRIPTION OF THE INVENTION

The apparatus is mounted on a base member 10 and in this embodiment comprises a rotor, having a general reference by arrow 12, that is mounted on the base member for rotation about a vertical spin axis 14 by means of a bearing support 16. The rotor comprises a disk portion 18 having an upper flat horizontal circular reactor surface 20 with the axis 14 as its center or generation and rotation, the disk portion being mounted on the upper end of a frusto-conical connecting portion 22 of decreasing diameter downward. The connecting portion is in turn mounted on a cylindrical shaft portion 24 of uniform diameter along its length, this shaft portion being engaged in a bearing (not shown) carried by the bearing support 16. The lower end of the shaft portion carries a V-groove pulley 26 connected by a drive belt 28 to a similar pulley 30 mounted on drive shaft 32 of a controllable speed drive motor 34 mounted on the base member 10. If preferred, any other form of controllable variable speed drive, as is well known in the art, can be employed that will enable the speed of rotation of the rotor to be adjusted to a required value.

The part of the rotor 12 above the base is surrounded by an enclosing stator casing consisting of an upper stator part 36 and a lower stator part 37 which are clamped together along their butting peripheries, in this embodiment by clamps 38. The casing upper part has a circular lower plate member 39, the circular lower surface of which provides a circular retaining surface 40 that extends radially and uniformly from the spin axis 14 and parallel and close to the reactor surface 20, the two surfaces forming between them a circular pancake shaped reaction passage 42, of uniform vertical axial dimension (thickness) between the surfaces 20 and 40, the passage ending in a circular peripheral diskharge outlet 44. The lower casing part 38 conforms in shape to that of the circumferential surfaces of the disk 18 and the connecting portion 22, and the part of the shaft portion 24 above the base member, forming between them an annular cross section flow passage 46 that extends from the reaction passage outlet 44 to a product diskharge outlet 48, the junction between the lower end of casing part 38 and shaft 24 being closed by a rotation accommodating shaft seal 50. The stator casing is supported from the base member 10 by a plurality (only two seen in FIG. 1) of circumferentially spaced precision turnbuckles 52 that enable the axial dimension 54 (see FIG. 3) of the chamber 42 to be set to any desired value, which in this embodiment is about 1 mm (0.04 in) or less, and preferably is 0.5 mm (0.02 in) or less, with a precision determined by that of the turnbuckles. Other mechanical structures providing the required precise adjustment and determination of the chamber gap will be apparent to those skilled in the art of precision machine design.

Figure 2:
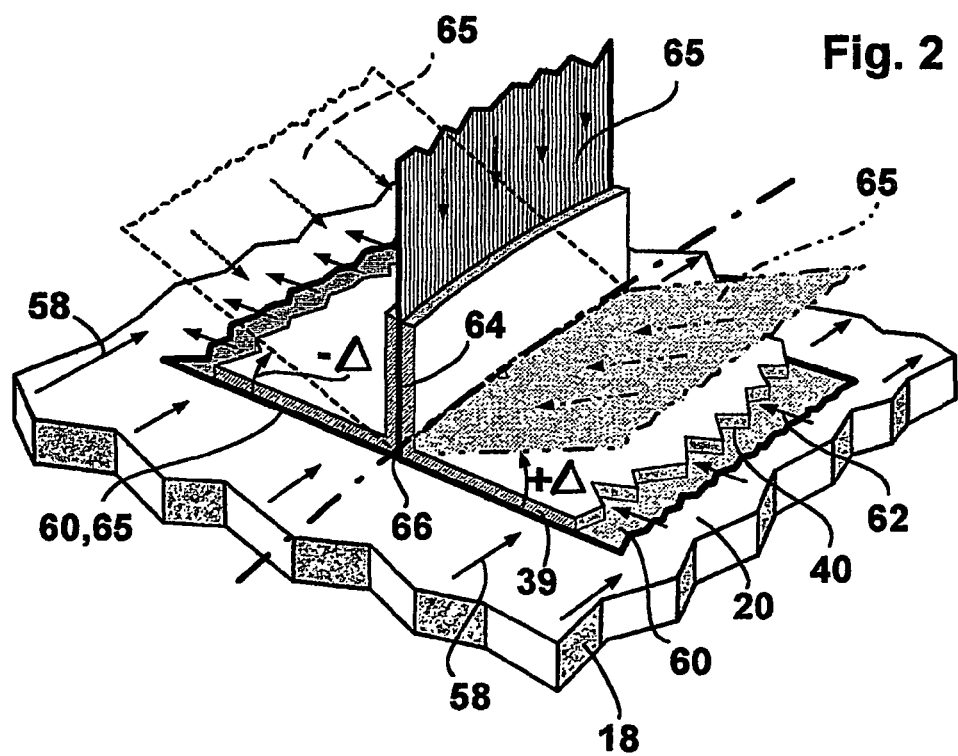
FIG. 2 is a perspective view to an enlarged scale of part of the reactor surface of apparatus such as is shown in FIG. 1, at a location at which a second film of reactant enters a preceding film already on the reactor surface, so as to show more clearly the manner in which a succeeding film enters a preceding film.
Figure 4:
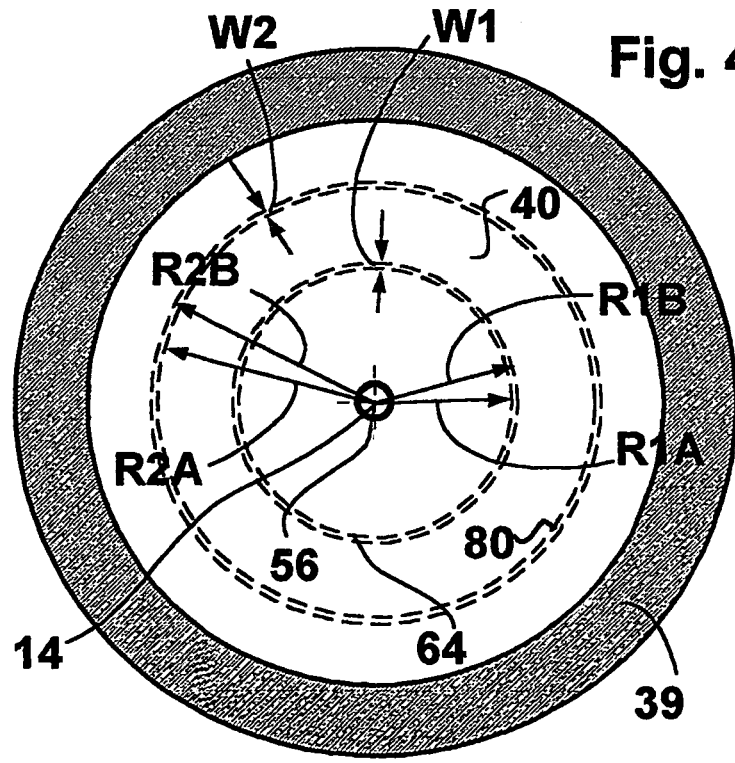
FIG. 4 is an end view of the retaining surface of the embodiment of FIG. 3 taken in the direction of the line 44 in FIG. 3.

A first reactant is fed via a precision metering pump (not shown) and a centrally disposed vertical inlet tube 56 on to the rotor reactor surface 20 at its center point. The rotor is rotating in the direction of the arrows 58 at a predetermined speed of rotation, typically in the range of 100 to 50,000 rpm, depending principally on the required shear rate and the pressure at which the reactant is being fed. The reactant immediately spreads over the surface 20 in the form of a first thin film 60 (FIG. 2) that, while moving radially through the reaction passage chamber 42 towards the flow outlet 44, as indicated in FIG. 2 by arrows 62, is also being uniformly sheared circumferentially between the surfaces 20 and 40 because of the rotation (arrows 58). A second reactant is fed via a precision metering pump (also not shown) to a narrow annular inlet 64 spaced radially outward from the rotor center. The value of the radially inner radius of the inlet 64 is indicated in FIG. 4 by reference R1A, while the value of its radially outer radius is indicated by reference R1B, the radial width of the nozzle inlet being shown as W1 and being equal to R1A-R1B. This inlet 64 has the form of an annulus so that the second reactant is delivered into the radially moving thin first reactant film 60 in the form of a thin, circular shape, annular second film 65 merging directly at a right angle into the film 60, at which point it is immediately, uniformly and simultaneously along its circular length also subjected to the shear between the relatively rotating surfaces. The thin film of second reactant enters the reactor passage 42 at a sharply defined very narrow, circular location, this confluence being indicated in FIG. 4 by the reference 66, the two reactants mixing immediately and uniformly with one another simultaneously around the circumference of the confluence location 66. It is at this location 66 therefore that reaction between the two reactants begins and the washer shaped part of the passage 42 between the inlet 64 and the diskharge outlet 44 may be regarded as the reaction zone of the reaction passage. For many, if not most, of the processes involved the speed of reaction is so fast that the reaction will be completed before the reacting reactants have reached the diskharge outlet 44. For example, it is possible to achieve the desired uniform molecular scale mixing within a period of less than 5 milliseconds during which the mixing reagents have moved a radial distance of less than 5 mm (0.2 in).

The reason and requirement for this manner of mixing the thin reagent films while subjected to uniform simultaneous shear will be described in more detail below. Thereafter the molecular scale, uniformly interspersed, reactants are subjected to intense, forced, molecular scale inter-diffusion caused by the high shear rates obtained by the high speed rotation of reactor surface 20 on one side of the flow against the stationary parallel retaining surface 40 on the other side. As indicated above, these parallel surfaces may be very closely spaced apart by only a fraction of a millimeter, for example 50 µm. Typical shear rates obtainable at such a gap size are between 10,000 and 100,000 $sec^{-1}$. It is important that the parallel spacing of the shearing surfaces permits only highly sheared, thin films such that no tank-like macro-agitation can be possible, again as will be described below. The fact that high speed, uniform, forced, molecular inter-diffusion of the reactant fluid molecules takes place can be verified by examining various chemical reactions performed in the reactor, two of which are described below, which are found to occur from about 50 to about 9,000 times faster than in a conventional stirred tank.

Figure 3:
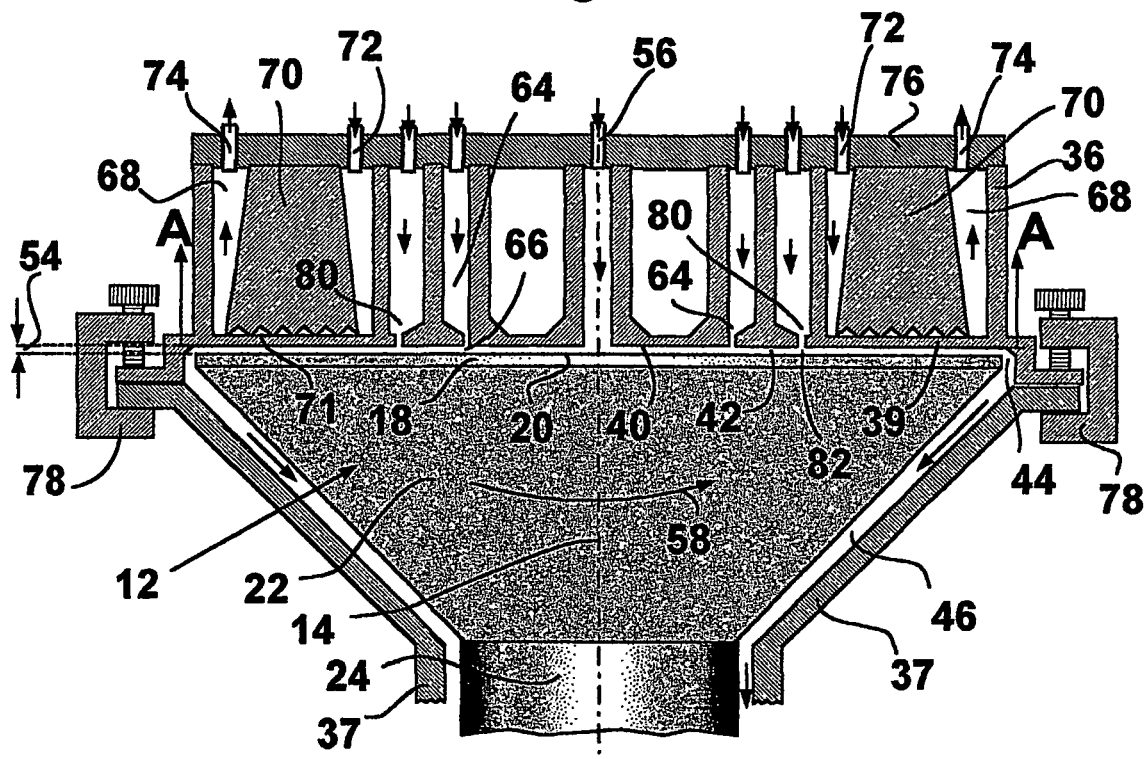
FIG. 3 is a cross section similar to FIG. 1, and of a second embodiment, wherein the reactor has provision for entry on to the reactor surface of three reaction components.

After passing through the high shear, thin, washer-like, reaction zone the resultant product, which may be a liquid, a suspension of fine solids in a liquid, or a gas mixed with a liquid, exits through outlet 44, turns around the edge of the spinning disk 18, and passes through the flow passage 46 to exit through outlet port 48. It is usually important to provide very accurate temperature control of the reactants before they enter the reaction passage, and also while the reaction/s are underway in the reaction zone. The reactants may be preheated or precooled, as required, before they even enter the reactor, and such arrangements are so well known as not to require illustration or description herein. The temperature required for the optimum reaction performance can be maintained, at least in the annular reaction zone, by heat transfer means provided, preferably in the stator, although heat transfer means may also be provided in the rotor, or in both. In the embodiments of FIGS. 1 and 3 such heat transfer means comprise an annular chamber 68 containing an annular heat transfer augmentation body 70 having its lower annular surface 71 in contact with the upper surface of the stator wall providing the retaining surface 40. The surface 71 is knurled to provide a multitude of interconnected heat transfer augmentation channels through which heat transfer fluid flows between an inlet 72 and an outlet 74. The need for a heat transfer system for the spinning reactor surface 20 can usually be avoided by making the disk and its mechanically connected portions of thermally insulating material. If an additional system is to be provided, such systems are well known, for example, to those skilled in the art of making heatable injection molding screws and do not need to be described herein.

The reactor and retaining surfaces 20 and 40 preferably are highly polished to a mirror finish so as to maximize the uniformity of the laminar shear required for the intense simultaneous molecular interdiffusion that is applied by the apparatus to the reagents in the passage 42. Less smooth surfaces may cause turbulence in the reacting mixture, and such turbulence is not wanted in the processes and apparatus of the invention and is therefore minimized as much as possible. The stator superstructure, particularly the upper stator part 36 carrying feed tubes, temperature control system, etc. is held firmly and dimensionally stably together by the top plate 76 which, as seen in the embodiment illustrated by FIG. 3, can be of relatively considerable thickness so as to provides structural strength and buckling resistance against internal pressures. It is possible with the methods and apparatus of the invention to facilitate the reactions taking place in the reaction passage by introducing a pressurized gas into the flow. Some reactions inherently produce large volumes of gas which will have this effect, and if it is desired to implement the flow, for example by use of a pressurized inert gas, this preferably is inserted into the flow of the first reagent, for example, by a gas injector 77 interposed in the first reagent inlet 56.

The apparatus of FIG. 3 is essentially similar to that of FIG. 1, with the addition that provision is made to feed a third reactant into the reaction passage 42. This third reactant is also fed via a precision metering pump (also not shown) to an inlet 78 spaced radially outward predetermined distances from the rotor spin axis 14 and from the second reactant inlet 64. This inlet 78 also has the form of a radially very thin annulus so that the reactant is delivered to the reactor surface and into the reaction zone in the form of a thin essentially circular film flowing into and mixing immediately and uniformly under high rotational shear with the existing radially moving combination of the first and second reactants at a circular location from the spin axis indicated by the reference 82. As with the inlet 64, the value of the radially inner radius of the inlet 80 is indicated in FIG. 4 by reference R2A, while the value of its radially outer radius is indicated by reference R2B, the radial width of the nozzle inlet being shown as W2 and being equal to R2A-R2B.

Figure 5:
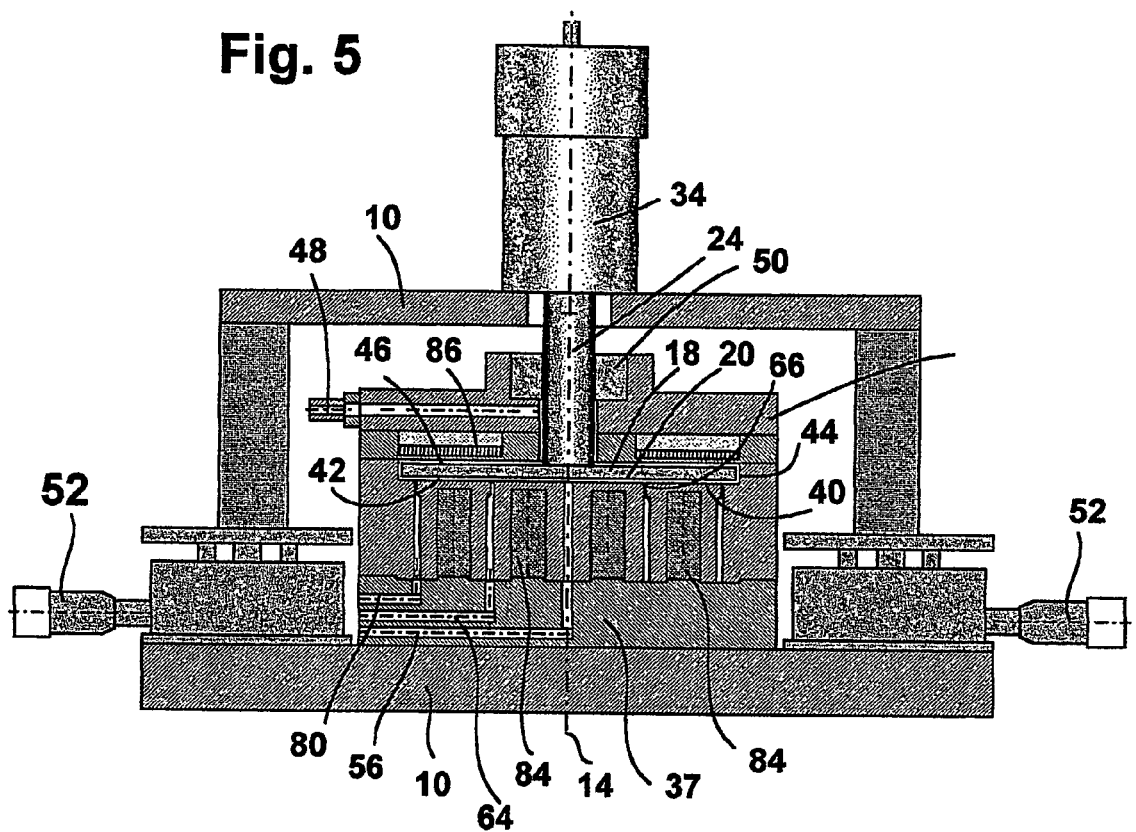
FIG. 5 is a cross section similar to FIGS. 1 and 3, and of a further embodiment of different structure, wherein again the reactor has provision for entry of three reaction components.

The apparatus of FIG. 5 again is essentially similar in its operation to hose of FIGS. 1 and 3 with some marked differences in structure. Thus, the spinning disk 18 is self-supporting, being connected directly to the lower end of drive shaft 24 without the intervention of a connecting portion 22. The turnbuckles 52 employed in the embodiment of FIG. 1 are replaced by precision micrometers 52. The portions of the flow passages for the reactants immediately preceding the inlets to the reaction passage 42 are provided with common annular inlet heat transfer means 84, which in this embodiment are annular heating elements warming the reagents to facilitate the reaction, equivalent to the heat transfer means 68, and by which their entry temperature is controlled, while the part of the exit flow passage immediately following reaction passage outlet 44 is provided with annular heat transfer means 86, which in this embodiment is an annular cooling unit that chills the product to stop the reaction and prevent possible unwanted side reactions.

UTILITY OF THE INVENTION

Two experiments were performed, both without the use of any catalyst, at room temperature and atmospheric pressure. In the first experiment 0.5 ml of thiophene was dissolved in 100 ml glycerol by vigorous stirring for 20 minutes. 50 ml of the resultant solution was filled into a 50 ml syringe and another 50 ml syringe was filled with 50 ml of reagent grade hydrogen peroxide. Both filled syringes were placed into a syringe pump and their contents pumped simultaneously into the spinning disk reactor of the invention, the glycerol/thiophene solution being introduced through the first central inlet port, while the hydrogen peroxide was introduced through the second, radially spaced annular inlet port, where the fluid reagents started to react together. Three different trial runs were performed at different flow rates corresponding to residence times in the apparatus of 2 seconds, 4 seconds and 15 seconds, the syringes being pumped simultaneously at steady flow rates in a 50% vs. 50% ratio until empty. The disk of the apparatus had a diameter of 7.50 cm (3.00 in) and was spun at 11,000 rpm, the reaction passage (42) having an axial dimension of 127 micrometers. The initial concentration of the thiophene was determined from the initial solution before beginning the experiment and entered into the graphical plot of FIG. 6 as residence time 0 seconds and relative concentration 1.0. Immediately after each trial run 1 ml of the exit stream from the reactor was removed and vigorously mixed with 1 ml of reagent grade n-hexane by stirring in a small glass test tube for about 15 minutes, thus performing a liquid/liquid extraction of unreacted thiophene into the hexane. Each thiophene/hexane mixture was subsequently centrifuged for 5 minutes and a respective 25 µl sample taken for analysis of concentration of unreacted thiophene in an HPLC analyzer fitted with an ultra-violet detector.

Figure 6:
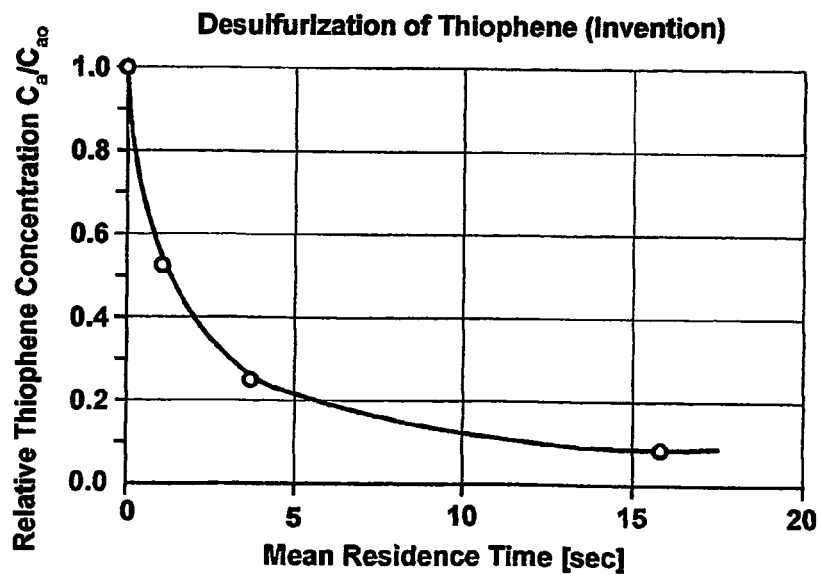
FIG. 6 is a graph showing the results of an experiment involving the desulferization of thiophene using a method and apparatus of the invention.
Figure 7:
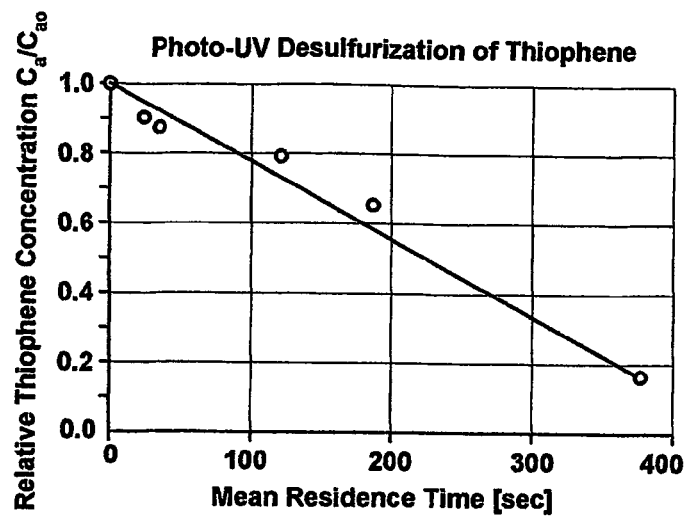
FIG. 7 is a graph showing the results of a comparable experiment for desulferization of thiophene using a prior art method of ultra-violet irradiation.

It will be seen from FIG. 6 that the 2 second run resulted in desulferization of the thiophene to 0.52 of the initial concentration value, the 4 second run a reduction to 0.26, and the 16 second run a reduction to 0.067. This is to be contrasted with the results in the graph of FIG. 7, showing the concentration reduction with time for the desulferization of thiophene using an advanced, lamionar film flow, prior art micro-reactor process in which the thiophene is irradiated with ultra-violet light in a continuous flow reactor. Mean residence times of 2 and 4 seconds produced negligible reduction in concentration, and concentrations such as those obtained with about 6 seconds residence in the apparatus of the invention were only obtained with ultra-violet irradiation times of about 380 seconds, an improvement factor of about 63 times.

The second experiment used dibenzothiophene (DBT) which is a notoriously difficult material to desulfurize, 0.2177 g of the DBT being dissolved in 5 ml of reagent grade n-hexane using vigorous ultrasonic agitation for 20 minutes. The resulting solution was added to 125 of glycerol and again vigorously stirred for 20 minutes, this mixture resulting in an emulsion that remained stable for the duration of the experiment. As with the first experiment two 50 ml syringes were filled respectively with 50 ml of the mixture and 50 ml of a 30% aqueous solution of reagent grade hydrogen peroxide. The filled syringes were placed into a syringe pump and their contents pumped simultaneously into the spinning disk reactor, the glycerol/DBT/hexane mixture being introduced through the central first inlet port, while the hydrogen peroxide was introduced through the second, annular inlet port, where the two fluids started to interdiffuse and react. The disk was spun at the same speed of 11,000 rpm. Both syringes were pumped simultaneously at steady flow rates in a 50% vs. 50% ratio until empty, and again three different runs were performed at flow rates such as to obtain residence times of 2 seconds, 4 seconds and 16 seconds, the initial concentration of the DBT being entered into the graph plot of FIG. 8 as 1.0 and as residence time 0 seconds. Immediately after each experimental run 1 ml of the exit stream from the reactor was removed and vigorously stirred for 15 minutes in a small glass test tube with 1 ml of reagent grade n-hexane, thus performing a liquid/liquid extraction of unreacted DBT into hexane. This mixture was subsequently centrifuged for 5 minutes and a 25 µl sample taken from the hexane solution layer. The four 25 µl samples resulting from the runs were analyzed to determine the concentration of unreacted DBT in an HPLC analyzer fitted with an ultra-violet detector.

Figure 8:
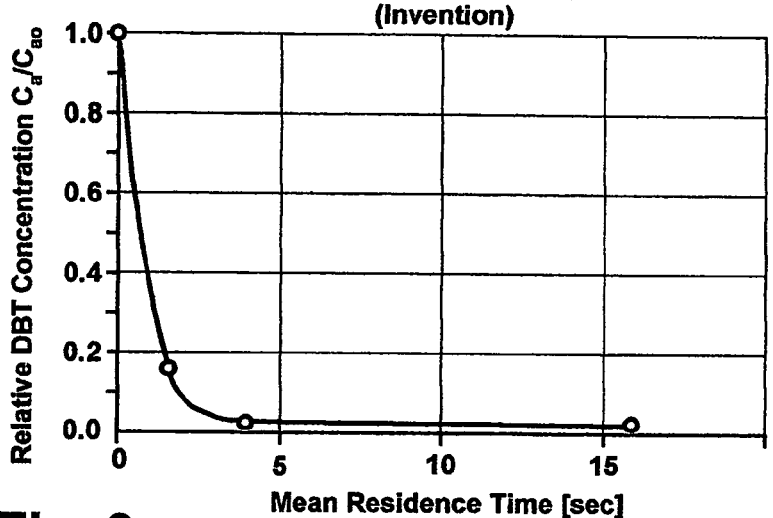
FIG. 8 is a graph showing the results of an experiment involving the desulferization of dibenzothiophene (DBT) using a method and apparatus of the invention.
Figure 9:
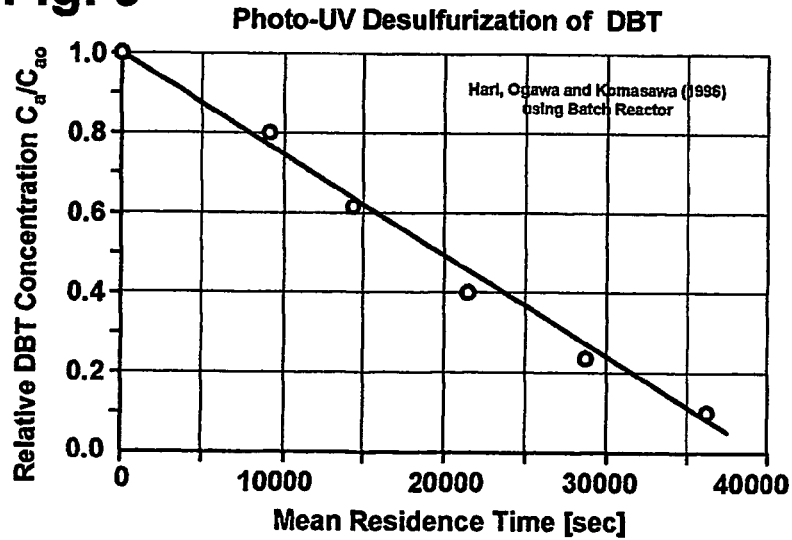
FIG. 9 is a graph showing the results of a comparable experiment for the desulferization of DBT using a prior art method of ultra-violet irradiation.

It will be seen from FIG. 8 that the 2 second run resulted in a very rapid desulfurization of the DBT to 0.175 concentration, while the 4 second run gave a reduction to 0.02 and the 16 second run the same value, so that apparently there was no further increase in desulfurization after 4 seconds. This is to be contrasted with the results in the graph of FIG. 9, showing the concentration reduction with time for the desulfurization of DBT using a standard, stirred tank, prior art process in which the DBT is irradiated with ultra-violet light in a continuous flow reactor. Mean residence (reaction) times of 4 and 8 seconds clearly produced negligible reduction in concentration, and concentrations which are still higher than those obtained with about 4 seconds residence in the apparatus of the invention were only obtained with ultra-violet irradiation times of about 10 hours, an improvement factor of about 9,000 times.

In the embodiments shown herein the thin circular film of the second, third, fourth, etc. reactant is combined with the first reactant film by engaging with it at a right angle, and usually this is preferred as the simplest from the structural point of view, while providing the required uniform, simultaneous micro-scale shear mixing of the reactants. In some versions of the apparatus it may be found difficult, if not impossible, to provide such right angle impingement, and although the minimum deviation is preferred, deviations from the perpendicular are tolerable, as is illustrated for example in FIG. 2, which shows in broken lines a deviation of the second thin film 65 of up to about 80 degrees from the vertical in one direction, and in chain broken lines a deviation of up to about 80 degrees from the vertical in the other direction.

All of the embodiments described and illustrated herein are spinning disk reactors in which the walls 20 and 40 of the reaction chamber 42 are spaced sufficiently closely that, as described above, the reacting materials are subjected to high shear rates producing uniform. intense, forced, molecular inter-diffusion. With a spinning disk the shear rate increases proportionately with the radial distance from the spin axis, and it is preferred with the invention that any subsequent reactant after the first is fed into the preceding reactant, or reactant mixture, at a distance from the spin axis such that shear rate is high enough to at least maintain, and perhaps even increase, the disruption of clusters and micro-scale mixing produced by the entering film. The invention is also applicable to surface reactors which do not comprise a spinning disk, but in which for example the first reactant has the form of a thin film moving across a reactor surface and any subsequent thin reactant film is again combined with the first reactant film with sufficient shear force applied immediately and simultaneously with the mixing to provide the necessary disruption, the shear required to maintain micro-scale mixing and the disruption of clusters being provided by pumping. In all the embodiments described and illustrated the spin axis 14 upon which the rotor turns is vertical, and the parallel surfaces of the chamber 42 are correspondingly horizontal. The intense, uniform, forced molecular interdiffusion that is produced will also occur if the spin axis is not vertical.

It is vitally important in designing processes for the interaction of fluids, and apparatus wherein such processes are to take place, to understand as fully as possible the "mechanics" of the interactions, and this becomes even more important when such interactions are chemical reactions that will result in new products. The following is presented as my understanding to date of the mechanics of this invention, although I do not intend the scope of the invention to be limited in any way by this presentation. As described above, the prior methods of achieving high mass transfer and especially accelerated chemical reaction kinetics, generally suffer from the inability to provide continuous, high-speed, uniform and forced inter-diffusion of reactant molecules on a molecular scale. Despite the improved mass transfer that can be obtained with the prior equipment referred to above many reactions are still diffusion controlled such that their rate depends on slow, natural "non-forced" molecular inter-diffusion. In addition, it is believed that achievement of fast interdiffusion is hampered significantly by the diffusion retarding preponderance of what may be termed molecular clusters or swarms, inherently occurring in liquids, within which clusters or swarms the molecules are anisotropically ordered from a kinematic point of view. Such ordering impedes rapid, natural interdiffusion due to the oscillation mode of the molecules within the clusters or swarms, consisting of large numbers of molecules oscillating in unison and unidirectionally on a scale <100 nm.

It is known that liquids, when not in motion or subject to bulk, random, macro-agitation, tend to form what has been variously referred to in the literature as molecular clusters, or cybotactic regions, or molecular domains, or molecular swarms, or clusters of synchronized, coupled molecular oscillators, or pseudo-compounds, hereinafter for convenience in description referred to as molecular clusters, unless quoting from some pertinent publication. When these molecular clustered liquids are forced to flow at high speed through very narrow, unidirectional and uniform shear-fields, e.g. between closely spaced, parallel flat and solid surfaces, as with the surfaces 20 and 40 of the apparatus of this invention, the molecular clusters break up and greatly facilitate unclustered, individual reactant molecules to encounter each other on a one on one basis, and thereby permit very rapid and efficient reactions to take place.

In a publication entitled Kinetic Theory of Liquids, published by Oxford University Press, First Edition 1946, p304, the author Jacob Frenkel refers to these clusters as molecular "swarms." According to Frenkel, these swarms usually have linear dimensions of the order of <100 nm, while the orientation of the molecules within the same swarm can gradually change from point to point, which must obviously correspond to an additional "elastic" energy. In a transition from one swarm to the next, the orientation of the molecules must change more or less sharply, accompanied by a rotation of their axes, often by an angle of the order of 90 degrees. The corresponding additional energy can be treated as the surface energy of the swarms, since it is proportional to the area of contact between them. In the case of anisotropic liquids, in the absence of external influences, the swarms maintain a practically constant structure, as is apparent from the permanence of the image observed through a polarization microscope. According to Frenkel it follows that the swarms have in this case an 'athermic' origin, i.e. they do not represent thermodynamically stable groupings, arising spontaneously as a result of thermal fluctuations, and in this respect they are similar to the crystallites of an ordinary solid body. The splitting up of a simple organic liquid, such as molten paraffin, into a large number of 'micro-swarms' (which must not be confused with micro-crystals because of the kinematic peculiarity of their rotations and deformations) is not due to extraneous causes and must arise as a result of the tendency of the molecules to be arranged in an energetically most advantageous way, i.e. in tight contact with each other, in spite of the thermal agitation, which tends to distribute them in an absolutely irregular manner.

This phenomenon is easily seen under an ultra-microscope. The enormously large number of liquid molecules that surround, for example, very small, nanometer size particles and cause them to move erratically in all directions (Brownian motion), can be viewed as molecular clusters containing in their centers the embedded submicron particles. When thermally oscillating, during the short, single straight paths between changes in direction, half of the molecules of the surrounding cluster move in a "forward" direction, while the other half retreat in the opposite direction in unison, making Brownian motion possible and even visible. Again, the number of molecules participating in these unison, orchestrated motions, are huge, otherwise they would not be able to so quickly accelerate and decelerate a suspended particle with its relatively large mass and inertia. Their combined mass is capable of pushing, accelerating and decelerating solid particles, such as fine pigment particles of sizes up to 1.5 micrometers along paths of considerable length, for example up to 800 nanometers. The frequency of these erratic and quirky movements increases as the clusters' and embedded particle sizes decrease. After hypothetically removing the particles from the liquid the clusters must remain continuing to vibrate at their respective frequencies. These orchestrated cluster motions are simultaneously and correspondingly associated with an equal number of compensating counter motions of other clusters and their molecules, even with clusters formed by chemically different liquids. In an ideal reaction, not just the surface molecules of reactant clusters react, slowly removing layer after layer of molecules from the cluster bodies, but all reactant molecules meet one on one as quickly as possible and in proper orientation to one another. But in the real world of chemical reaction engineering, time consuming mass transfer through agitation after many minutes, hours and days, finally may consume the dusters of reagent molecules. Thereafter, and finally, the slow process of molecular diffusion from the interior of the clusters to their surface makes it possible for individual molecules of immediately adjacent clusters to react with one another to form new product molecules with their own clusters, or to be interspersed between the molecules of the remaining reactants and/or their clusters.

The problem solved by the present invention is to reduce the time required for uniform mixing of two or more reactants to a few milliseconds, and thereby and thereafter to forcibly inter-diffuse the molecules contained in the reactants' clusters nearly instantaneously and as uniformly as possible to allow a very rapid encounter of all reactant molecules as simultaneously as possible, thus allowing chemical kinetics to be used and exploited without being masked and blanketed by issues of mass transfer. According to Frenkel the molecular clusters are generated by the superposition of hypersonic, longitudinal pressure waves which permeate liquids in all directions and cause the formation of interference patterns, complete with pressure/density nodes and antinodes, whose position fluctuates continuously in accordance with the changing beat frequencies caused by the superposed wave trains crisscrossing the liquid body. In turn, the longitudinal pressure waves originate in the translational, angular and rotational oscillations of the individual molecules and their coupled oscillations. This theory of the formation, origin and kinematics of molecular clusters or swarms has been experimentally simulated and demonstrated on a large scale model by elastically bonding together a larger number of metallic, spiral springs into a large panel, representing liquid molecules in a plane, and making them oscillate. It was possible to observe a continuously changing kaleidoscope of coupled, oscillating spring clusters, forming constantly changing shapes and oscillatory directions of coherent groups of springs. There was no display of disorganized, totally random, mutually independent movements or oscillations of individual spring elements, which would have represented the mechanism of natural molecular diffusion as described classically. This simulation therefore demonstrates a possible origin of the formation and existence of molecular "swarms" or "clusters" and the opposition they render to the diffusional independence of single oscillating elements (representing single molecules), necessary for high yield and rapid chemical reactions. The problem is solved therefore, as is described above, by providing methods and apparatus in which the various reactants are mechanically contacted with one another in a manner such that these "Frenkel" type molecular clusters are disrupted and broken up and their molecules re-aligned in a manner which facilitates chemical and/or physical reaction between the contacting reagents.

LIST OF REFERENCE SIGNS

10. Apparatus base member
12. Rotor general reference arrow
14. Rotor spin axis
16. Rotor bearing support
18. Rotor disk
20. Circular reactor surface
22. Rotor frusto-conical connecting portion
24. Rotor cylindrical shaft portion
26. Pulley on shaft portion 24
28. Drive belt
30. Pulley on drive motor shaft
32. Motor drive shaft
34. Controllable speed drive motor
36. Upper stator casing part
37. Lower stator casing part
39. Lower circular plate of upper casing part
40. Circular retaining surface of reaction passage
42. Reaction passage between surfaces 20 and 40
44. Peripheral diskharge outlet of passage 42
46. Flow passage in stator from outlet 44
48. Product diskharge outlet
50. Rotating shaft seal
52. Turnbuckles/micrometers connecting base member and stator casing
54. Axial dimension of reactor passage 42 (FIG. 3)
56. Inlet to reaction passage 42 for first thin reactant film
58. Arrows indicating direction of rotor rotation
60. First thin film from inlet 56
62. Arrows indicating direction of flow of first thin film
64. Inlet for second reactant
65. Second thin film from inlet 64
66. Confluence of first and second thin films
68. Annular stator heat transfer chamber
70. Heat transfer augmentation body
71. Annular heat transfer surface for body 70
72. Inlet to heat transfer chamber 68
74. Outlet from heat transfer chamber
76. Stator circular top plate
77. Gas injector into first reactant inlet 56
78. Holding clamps for stator casing
80 Inlet for third reactant
82. Circle of confluence of third reactant with preceding mixture
84 Heat transfer means before reaction chamber 42
86 Heat transfer means after reaction chamber 42

I claim:

1. Methods of operating surface reactors comprising in each method the steps of:
    providing a reactor body having a reactor surface;
    feeding a first reactant to the reactor surface from a first entry location so that the reactant spreads out on the surface in the form of a first thin film;
    feeding a second reactant to the reactor surface from a second entry location so that the reactants can interact in a reaction zone on the reaction surface; and
    collecting the product of the interacting reactants at an outlet location; wherein:
    the reactor body provides a retaining surface closely spaced from the reactor surface so as to form between them a reaction passage providing a reaction zone between the second entry location and the outlet location and through which the reactants fed to the reactor surface will pass while reacting with one another, the reactor and retaining surfaces being movable relative to one another to apply shear between them to reactants passing in the reaction passage;
    each reactant after the first is fed to the reactor surface in the form of a respective thin film that is fed into a respective preceding thin film or combination of thin films, each thin film at its entry to the reaction passage immediately being subjected at its intersection with the preceding thin film or combination of thin films to continuous and uniform shear, the shear rate being such as to disrupt molecular clusters in the thin films and thereby permit the molecules of the thin films to aggressively react with one another to form the resultant product,
    wherein one or both of the reactor surface and the retaining surface is provided with heat transfer means to heat or cool the reactants in the reaction passage.

2. A method as claimed in claim 1, wherein the reactor surface is a surface of a disk spinning about a rotational axis;
    and wherein shear in the reaction passage is transverse to the direction of the flow of reactants in the passage and is produced by relative rotation between the moving reaction surface and the retaining surface which is stationary.

3. A method as claimed in claim 1, wherein the thickness dimension of the reaction chamber can be varied and is less than 1.00 mm (0.04 in).

4. A method as claimed in claim 1, wherein the thickness of each of the first and second thin films is between 5 and 500 micrometers.

5. A method as claimed claim 1, wherein the width dimension of the reaction zone in the direction of flow in the reaction passage is between 1 mm and 500 mm.

6. A method as claimed in claim 1, wherein each thin film after the first thin film is fed to the reactor surface and into the first thin film or combination of thin films that precedes it on the reactor surface providing substantially instantaneous micromixing of the films.

7. A method as claimed in claim 1, wherein each thin film after the first thin film is fed to that thin film or to its mixture of thin films at an entry location spaced at a radial distance from the rotation axis such as to provide the shear required to ensure disruption of molecular clusters in the reacting reactants.

8. A method as claimed in claim 1, wherein each thin film is fed into the thin film that receives it through a respective annular nozzle producing a respective circular cross section thin film directed at the reactor surface.

9. A method as claimed in claim 1, wherein the reactor surface and the retaining surface are polished to a mirror finish smoothness.

10. A method as claimed in claim 1, wherein the shear in the interacting reactants is increased by introduction of a pressurized gaseous component into the reaction passage.

11. A method as claimed in claim 1, wherein each thin film after the first thin film impinges substantially perpendicularly with the first thin film or combination of thin films that precedes it on the reactor surface to provide micromixing before shearing.

12. A surface reactor comprising:
a reactor body having a reactor surface;
means for feeding a first reactant to the reactor surface from a first entry location so that the reactant spreads out on the reactor surface in the form of a first thin film;
means for feeding a second reactant to the reactor surface from a second entry location so that the reactants can interact in a reaction zone on the reactor surface; and
means for collecting the product of the interacting reactants at an outlet location;
wherein:
the reactor body provides a retaining surface closely spaced from the reactor surface so as to form between them a reaction passage providing a reaction zone between the second entry location and the outlet location and through which the reactants fed to the reactor surface will pass while reacting with one another, the surfaces being movable relative to one another to apply shear between them to reactants passing in the reaction passage;
each reactant after the first reactant is fed to the reactor surface in the form of a respective thin film that is fed into a respective preceding thin film or combination of thin films, each thin film at its entry to the reaction passage immediately being subjected at its intersection with the preceding thin film or combination of thin films to continuous and uniform shear therein, the shear rate being such as to disrupt molecular clusters in the thin films and thereby permit the molecules of the thin films to aggressively react with one another to form the resultant product,
wherein there are provided for one or both of the reactor surface and the retaining surface heat transfer means to heat or cool the reactants in the reaction passage.

13. A surface reactor as claimed in claim 12, wherein the reactor surface is a surface of a disk spinning about a rotational axis;
and wherein shear in the reaction passage is transverse to the direction of the flow of reactants in the passage and is produced by relative rotation between the moving reaction surface and the retaining surface which is stationary.

14. A surface reactor as claimed in claim 12, wherein the reactor comprises means whereby the thickness dimension of the reaction passage can be varied, and the thickness dimension is less than 1.00 mm (0.04 in).

15. A surface reactor as claimed in claim 14, wherein the thickness dimension of the reaction passage is less than 0.5 mm (0.02 in).

16. A surface reactor as claimed in claim 12, wherein each entry location feeds the respective reactant in the form of a thin film of thickness between 5 and 500 micrometers.

17. A surface reactor as claimed in claim 12, wherein the width dimension of the reaction zone in the direction of flow in the reaction passage is between 1 mm and 500 mm.

18. A surface reactor as claimed in claim 12, wherein the means feeding each thin film after the first thin film to the reactor surface is fed to the reactor surface into the first thin film or combination of thin films that precedes it on the reactor surface providing substantially instantaneous micromixing of the films.

19. A surface reactor as claimed in claim 12, wherein the entry location for each thin film after the first thin film is at a radial distance from the rotation axis such as to provide the shear required to ensure disruption of molecular clusters in the reacting reactants.

20. A surface reactor as claimed in claim 12, wherein each thin film after the first film is fed into the film that receives it through a respective annular nozzle producing a respective circular cross section thin film directed at the reactor surface.

21. A surface reactor as claimed in claim 12, wherein the reactor surface and the retaining surface are polished to a mirror finish smoothness.

22. A surface reactor as claimed in claim 12, comprising means for the introduction of a pressurized gaseous component into the reaction passage to increase the shear in the reacting reactants.

23. A surface reactor as claimed in claim 12, wherein the means feeding each thin film after the first thin film to the reactor surface impinges substantially perpendicularly with the first thin film or combination of thin films that precedes it on the reactor surface to provide micromixing before shearing.

* * * * *